United States Patent [19]

Kronogard

[11] 4,176,519
[45] Dec. 4, 1979

[54] GAS TURBINE HAVING A CERAMIC ROTOR

[75] Inventor: Sven O. Kronogård, Lomma, Sweden

[73] Assignee: United Turbine AB & Co., Kommanditbolag, Malmo, Sweden

[21] Appl. No.: 839,273

[22] Filed: Oct. 4, 1977

Related U.S. Application Data

[60] Division of Ser. No. 638,052, Dec. 5, 1975, Pat. No. 4,064,690, which is a continuation-in-part of Ser. No. 471,176, May 17, 1974, Pat. No. 3,943,703.

[30] Foreign Application Priority Data

May 22, 1973 [SE] Sweden ............................ 07153/73

[51] Int. Cl.² ............................ F01D 5/28; F01D 5/30
[52] U.S. Cl. ............................ 60/39.16 R; 60/39.32; 415/214; 416/241 B; 416/244 A
[58] Field of Search ............... 60/39.16 R, 39.16 S, 60/39.31, 39.32; 415/214; 416/241 B, 244 A; 403/1, 298

[56] References Cited

U.S. PATENT DOCUMENTS

| 2,297,508 | 9/1942 | Schutte | 416/241 B |
| 2,577,134 | 12/1951 | Land | 416/244 A |
| 2,676,458 | 4/1954 | Hill | 60/39.16 |
| 2,950,082 | 8/1960 | McVeigh | 416/244 A |
| 3,604,819 | 9/1971 | Krahe et al. | 416/241 B |

FOREIGN PATENT DOCUMENTS

| 1475380 | 4/1969 | Fed. Rep. of Germany | 416/244 A |
| 248083 | 1/1948 | Switzerland | 416/244 A |

Primary Examiner—Louis J. Casaregola
Attorney, Agent, or Firm—Holman & Stern

[57] ABSTRACT

A ceramic turbine rotor fitted to a metal shaft has an integral shaft stub, extending into the hollow end of the metal shaft, and is resiliently retained therein. In order to prevent relative rotation between the rotor and the shaft during torque transfer, the stub shaft and a clamping and tightening member, within the metal shaft, are provided with interengaging parts. The stub shaft, the clamping member and the hollow metal shaft may be formed with mating, interengaging corrugations and grooves running substantially axially. The stub shaft may alternatively have a polygonal cross section, and the clamping member and the void in the hollow shaft will then have mating, but successively bigger cross sections.

2 Claims, 3 Drawing Figures

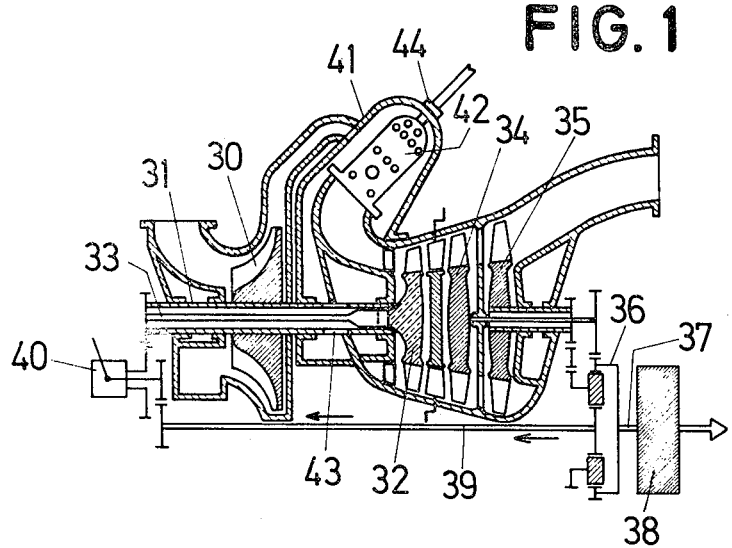
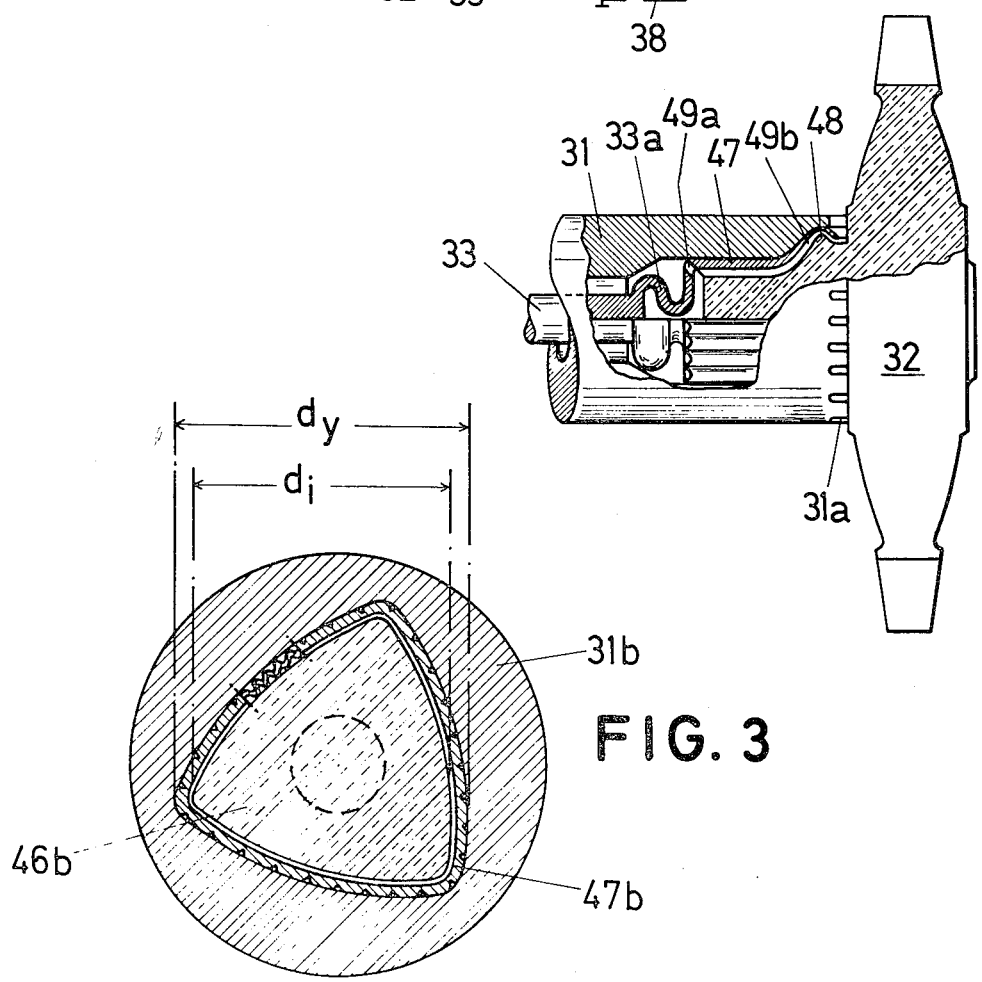

GAS TURBINE HAVING A CERAMIC ROTOR

BACKGROUND OF THE INVENTION

This application is a divisional application of U.S. Pat. No. 4,064,690, Application No. 638,052 filed Dec. 5, 1975, which in turn was a continuation-in-part application of U.S. Pat. No. 3,943,703, Application No. 471,176 filed May 17, 1974.

REFERENCE TO RELATED ART

U.S. Pat. No. 2,950,082, and inventor's U.S. Pat. No. 3,943,703 show ceramic turbine rotors having an integral shaft stub to be fitted to a metal shaft structure. Those designs, however, do not include efficient means for preventing relative rotation between rotor and shaft structure, while retaining the desirable resilient properties necessary with respect to the different coefficients of expansion and the brittleness of the ceramic material.

Gas turbine power plants, especially small sized ones, where it is difficult to provide a cooling of the turbine, suffer from certain disadvantages, mainly high specific fuel consumption, high costs and specific space requirements. One of the most efficient remedies is to raise the gas temperature, but the strength of conventional, uncooled metallic, heat resistant materials will set a limit to that. Ceramic materials, on the other hand, have a far better capacity to withstand high temperatures, but their strength is generally much less than that of metallic materials. For commercially available ceramic materials, suitable for mass production, the practically useful strength is roughly about one half only, of the finest heat resistant metallic materials, taking brittleness and production statistics into account.

Many proposals for making turbine rotors wholly or partly of ceramic materials have been put forward, but have, so far, been no practical success due to these limitations, and to lack of full understanding of the behaviour of ceramic material and statistics from production (Weilbull's number etcetera).

In order to secure simplicity of design the turbine driving the compressor is mounted upon the same shaft as the latter. It is here presupposed that the gas turbine plant is of sufficient advanced design to have at least one further turbine delivering external power and that the components are of conventional turbo type, i.e., centrifugal or axial compressor and axial or radial turbine.

The ceramic rotor has to be fitted to a metal shaft, which requires much care to be taken due to the different coefficients of expansion, and the inherent strengths of the two materials. Different means have been proposed for resiliently retaining the rotor at the shaft, but the transfer of torque from the turbine for driving the compressor causes a tendency for relative rotation between rotor and shaft.

SUMMARY OF THE INVENTION

The aim of the present invention is to propose means for counteracting such relative rotation, and includes a resilient clamping member and a tightening rod for engagement with said stub shaft, and mating, interengaging parts on said stub shaft and said clamping member, for preventing relative rotation during torque transfer.

The means for preventing rotation may include corrugations at said clamping member, running substantially axially, and mating grooves in said stub shaft. Preferably the stub shaft is formed with a polygonal cross section, said clamping member and the void in said hollow shaft being formed with mating, but successively bigger cross sections.

BRIEF DESCRIPTION OF THE DRAWING

FIG. 1 is a longitudinal section through a turbine having rotor means according to the invention, and FIGS. 2 and 3 show alternative ways of attaching a ceramic rotor to a metal shaft.

DESCRIPTION OF SOME PREFERRED EMBODIMENTS

FIG. 1 illustrates a simple gas turbine power plant suitable for automotive installation and having a compressor, 30 driven by a first turbine rotor 32 of undersized diameter, being incapable of supplying the necessary power for driving the compressor. This rotor will thus be working with considerably reduced centrifugal and other stresses.

The compressor 30 is mounted upon a hollow shaft 31, which carries rotor 32 with integral vanes, made of ceramic material. This rotor is releasably and flexibly mounted upon shaft 31 by means of an internal, threaded rod 33 and nut means, not shown. Second and third rotors 34 and 35, respectively, of which at least last mentioned one is manufactured of metallic material, are arranged downstream of first rotor 32, and are both connected to a planetary gear 36.

An output shaft 37 from the ring wheel of this gear drives the wheels of the vehicle denoted by 38, while a second shaft 39 connected to its sun wheel supplies additional power for driving the compressor by way of a variable transmission 40. The arrangement permits rotor 34 to deliver power to the compressor and the auxiliaries also during temporary stops of the vehicle.

Due to the very low inertia of the "undersized" turbine rotor the variable transmission and the power turbine inertia effect, it is possible to obtain a fast acceleration of the gas producer part without the overtemperatures occuring in a conventional plant. The "undersized" compressor turbine will thus operate at low peripheral speed, and not be subjected to the same temperature gradients as in conventional turbines, which reduces the mechanical, as well as the thermal strains upon the rotor, especially in its vanes and rim. This makes it possible to use available ceramic material, and also to manufacture rotor and vanes as an integral component, e.g. by sintering or hot-pressing. It is thus possible to raise the temperature of the gases from combustion chamber, while still using a simple turbine design.

Air from compressor 30 passes up to a plenum chamber 41 enclosing a combustion chamber 42. Part of the air passes downwards, and enters openings 43 in hollow shaft 31, from which it is conveyed to rotor 32 for cooling the same as well as the shaft and a flexible clamping member locating the rotor.

The combustion chamber is provided with burner means 44. Fuel pumping and governing means (not shown) are provided to ensure a supply of fuel, resulting in gas temperatures considerably in excess of those used in conventional turbines, with a first rotor of metallic material.

FIG. 2 illustrates one way of resiliently mounting a rotor of ceramic material upon a metal shaft, so due consideration will be taken to the different coefficients of thermal expansion for those two materials.

Rotor 32 of the gas turbine in FIG. 1 is made of ceramic material with integral vanes and a centrally located shaft stub 46, which fits into one end of hollow shaft 31. The rod 33 extending through this shaft is at its end remote from the rotor provided with nut means for tightening the attachment.

The end of rod 33, adjacent to the rotor, is formed as an open-ended sleeve having axially corrugated side walls 47 and ending in a number of axially directed bent fingers, engaging an annular bead 48 at the root of shaft stub 46.

The connection between the open-ended sleeve clamping member and rod 33 proper is formed as an axial spring element 33a. This is desirable if the shaft end, in order to obtain a secure positioning of the rotor disc, extends so it obtains contact with the latter.

The corrugations 47 in the side walls of the sleeve clamping member must not run straight in the axial direction, but can be arranged peripherally/helically along the stub shaft.

In order to prevent mutual rotation between the clamping member and the stub shaft, and thus to facilitate torque transfer, the latter is provided with grooves for the reception of at least part of said corrugations.

As mentioned in connection with FIG. 1 air from the compressor is supplied to the interior of shaft 31. The sleeve end of rod 33 is provided with openings 49a at its inward end and slots 49b between the fingers at its outward end, so air can pass axially through fitting for cooling the same, as well as the rotor shaft, which is provided with axial slots, 31a, for the cooling air.

This fitting will maintain a safe grip, irrespective of thermal changes in the axial or the radial direction.

FIG. 3 illustrates an alternative type of attachment between the rotor and the clamping member. The stub shaft 46b has a polygonal cross section. The polygon shape is here of the 3-lobe type, but may have four or more lobes. The clamping member 47b, and the passage at the end of hollow shaft 31b will be formed with correspondingly shaped cross sections, however increasing in size.

A characterizing feature of a polygon shaped cross section is that the "diameters", i.e., transverse measures through the centre are constant. The respective measures for the internal surface of the hollow shaft and the external surface of the stub shaft, are denoted dy and di, respectively.

These surfaces may be simply ground, and the polygon shape will ensure a safe torque transfer.

The clamping member is here provided with transverse corrugations, provided with slots for permitting axial air flow. The transverse corrugations will ensure resiliency in the axial direction, but also compensate temperature movements in the radial direction.

Instead of transverse corrugations the clamping member may be provided with axial, or substantially axial corrugations and an axial spring member 33a, as shown in FIG. 2.

What I claim is:

1. In a gas turbine power plant comprising a compressor, a first turbine rotor mounted upon the same shaft as, and imparting rotary movement to said compressor, at least one further turbine rotor mounted upon a shaft separate from that of said first turbine rotor and compressor combination, and at least one combustion chamber having fuel supply means, receiving air from the compressor and supplying combustion gas to said first and at least one further turbine rotor, the improvement of said shaft mounting said first turbine rotor and said compressor, being hollow, said first turbine rotor being manufactured of ceramic material and being provided with an integral shaft stub, to be introduced into said hollow shaft, means including a resilient clamping member and a tightening rod for engagement with said stub shaft, and mating, interengaging means on said stub shaft and said clamping member, for preventing relative rotation during torque transfer wherein said rotation preventing means include corrugations at said clamping member, running substantially axially, and mating grooves in said stub shaft.

2. The gas turbine power plant according to claim 1, in which said hollow shaft extends so as to abut against the disc of said first turbine rotor, and the connection between said tightening rod and said clamping member includes an axial spring means, acting and located between said tightening rod and said clamping member.

* * * * *